(12) United States Patent
Tomioka

(10) Patent No.: US 7,233,262 B2
(45) Date of Patent: Jun. 19, 2007

(54) MAGNETIZING JIG

(75) Inventor: Masanori Tomioka, Okayama (JP)

(73) Assignee: Uchiyama Manufacturing Corp., Okayma-shi, Okayama (JP)

( * ) Notice: Subject to any disclaimer, the term of this patent is extended or adjusted under 35 U.S.C. 154(b) by 0 days.

(21) Appl. No.: 10/542,367

(22) PCT Filed: Jan. 19, 2004

(86) PCT No.: PCT/JP2004/000354

§ 371 (c)(1),
(2), (4) Date: Jan. 3, 2006

(87) PCT Pub. No.: WO2004/066323

PCT Pub. Date: Aug. 5, 2004

(65) Prior Publication Data

US 2006/0113993 A1 Jun. 1, 2006

(30) Foreign Application Priority Data

Jan. 17, 2003 (JP) .............................. 2003-009323

(51) Int. Cl.
*H03M 1/22* (2006.01)
(52) U.S. Cl. ....................................................... 341/15

(58) Field of Classification Search .................. 341/11, 341/13, 15, 12
See application file for complete search history.

(56) References Cited

U.S. PATENT DOCUMENTS

| | | | | |
|---|---|---|---|---|
| 4,774,464 A | * | 9/1988 | Kubota et al. | .......... 324/207.25 |
| 5,115,239 A | * | 5/1992 | Ushiyama | ..................... 341/15 |
| 6,683,545 B2 | * | 1/2004 | Strasser | ........................ 341/16 |

* cited by examiner

*Primary Examiner*—Brian Young
(74) *Attorney, Agent, or Firm*—Bacon & Thomas, PLLC

(57) ABSTRACT

A magnetizing jig used in cooperation with a magnetizing yoke formed with a circular magnetizing face, for fixing a ring-like magnetic encoder base plate to be magnetized thereto and magnetizing it by exciting a multi-pole magnetizing coil provided on the magnetizing yoke. The magnetizing yoke has holding portion to which the magnetic encoder base plate is concentrically held so as to face the circular magnetizing face, whereas the magnetizing jig is incorporated into the magnetizing yoke, keeping a predetermined positional relation which is in advance deviated from the center of the magnetizing yoke so as to correspond to the positional deviation amount between the arrangement center of the multi-pole magnetizing coil and the center of the magnetizing yoke.

15 Claims, 11 Drawing Sheets

MAGNETIZING JIG

TECHNICAL FIELD

This invention relates to an improvement of a magnetizing apparatus of a magnetic encoder (multi-pole magnet) for use in a wheel rotation detection apparatus of automobile and more particularly to a magnetizing jig preventing magnetizing deviation after magnetizing a magnetic encoder.

BACKGROUND ART

A magnetizing apparatus provided with a magnetizing yoke arranged with plural magnetizing coils in a radial pattern or in a circumferential manner has been used for magnetizing a magnetic encoder provided with the south pole and the north pole in a circumferential manner. Positioning hole is provided at the center of the magnetizing yoke as the center of the yoke, the magnetic encoder base plate to be magnetized is placed thereon or is faced each other to be fixed with a presser jig, then the magnetizing current is externally supplied to a wire of a magnetizing coil to achieve multi-pole magnetizing on the magnetic encoder on which the S poles and N poles are alternately arranged (for example, JP-A-10-115628).

DISCLOSURE OF THE INVENTION

However, according to the above-mentioned magnetizing apparatus, the following disadvantages haven't been solved and their solutions have been desired.

Because the multi-pole magnetized magnetic encoder is attached to detect the rotation number of the rotary member, the magnetizing member is of course rotated. Therefore, if the south pole and the north pole provided in a circumferential manner are deviated (the arranged center is deviated from the center of the rotary member), accumulated pitch difference is caused to largely reduce the pulse generation performance. It is required to meet the center of the rotary member with the arrangement center of the north pole and the south pole. For this purpose, the process accuracy of magnetic encoder has to be high and the arrangement center position has to be accurate.

Positioning hole of the magnetizing apparatus is used for its purpose. If the magnetic encoder base plate isn't placed on the magnetizing yoke while keeping the accurate center, the accurate center isn't formed. Further, advanced drilling operation is required for turning up the wick to the positioning hole. Even if the drilling operation is executed with high accuracy, depending on the wound position when electrical leads are wound around the iron core of the yoke, there might be a possibility that the true center of the yoke (true arrangement center of the magnetizing coil) is deviated from the center position of the positioning hole. FIG. 11 represents a graph showing the relation of the core deviation of the magnetizing portion (with the rotary center) and the accumulation pitch accuracy of the magnetic encoder, by which it is understood that the core deviation is larger, the accumulation pitch accuracy is worth.

Considering the above-mentioned disadvantage such that a lot of labor is required for producing the magnetizing apparatus, the present invention has been proposed. The object of the present invention is to provide a magnetizing jig capable of magnetizing simply with high accuracy.

According to the magnetizing jig of the present invention, it is used in cooperation with a magnetizing yoke for fixing a ring-like magnetic encoder base plate thereto and magnetizing it by exciting a multi-pole magnetizing coil provided on a circular magnetizing face of the magnetizing yoke along its circumference at the same interval, wherein the magnetizing jig comprises a hoding portion for concentrically holding the magnetic encoder base plate so as to face the circular magnetizing face, and wherein the magnetizing jig is incorporated into the magnetizing yoke, keeping a predetermined positional relation which is in advance deviated from the center of the magnetizing yoke so as to correspond to the positional deviation amount between the center of the multi-pole magnetizing coil and the center of the magnetizing yoke.

As mentioned in claim 2, the magnetizing jig may comprise a magnetizing jig body provided with the holding portion, and a positioning member interposed between the magnetizing jig body and the magnetizing yoke, for positioning the magnetizing jig body for the magnetizing yoke, and the insertion center of the positioning member for the magnetizing yoke and the insertion center of the positioning member for the magnetizing jig body may be deviated each other corresponding to the deviation amount. As mentioned in claim 3, it is preferable that the magnetizing yoke has a bore for holding jig at its center, whereas the positioning member comprises a tubular bush which is internally fitted into the bore and is externally fitted into a boss portion concentrically formed at the center of the magnetizing jig body, wherein the center of an inner tubular portion of the tubular bush and the center of an outer tubular part of the tubular bush internally fitted into the bore are deviated each other corresponding to the deviation amount.

The magnetizing jig may be directly attached to the magnetizing yoke. For example, as mentioned in claim 4, it is preferable that the magnetizing jig comprises a tubular bush structure with a holding portion for holding the base plate, which is internally fitted into the ring-like magnetic encoder base plate, whereas the magnetizing yoke has at its center an insertion holding portion into which the bush structure is inserted, and wherein the center of the tubular bush structure for the holding portion and an insertion center of the tubular bush structure for the magnetizing yoke are deviated each other corresponding to the deviation amount. Further, as mentioned in claim 5, it is preferable that the magnetizing jig comprises a circular basin-like guide body with a bored holding portion into which the ring-like magnetic encoder base plate is externally inserted, whereas the guide body is externally fitted into a circular yoke, and wherein the center of the guide body for the holding portion and the external insertion center of the guide body for the magnetizing yoke are deviated each other corresponding to the deviation amount.

Still further, the design of magnetizing jig may be appropriately modified depending on the shape of a desired magnetic encoder. For example, in case of a disc-like magnetic encoder, as mentioned in claim 6, the magnetic encoder base plate has a disc like portion to be magnetized, whereas the circular magnetizing face is formed on a disc surface of a disc-like magnetizing yoke, and the multi-pole magnetizing coil is composed of wires radially wound around the magnetizing yoke, and the disc face of the disc-like magnetic encoder base plate is magnetized by exciting the multi-pole magnetizing coil. Further, in case of a tubular magnetic encoder, as mentioned in claim 7, the magnetic encoder base plate has a tubular portion to be magnetized, whereas the circular magnetizing portion is formed in the inner tubular face of the tubular magnetizing yoke, and the multi-pole magnetizing coil is composed of wires wound along the axis of the magnetizing yoke, and an outer tubular face of the tubular magnetic encoder base plate is magnetized by exciting the multi-pole magnetizing coil.

The magnetizing jig of the present invention is constructed to be incorporated into the magnetizing yoke while keeping the positioning relation deviated in advance from the center of the magnetizing yoke so as to correspond to the positional deviation amount between the center of the multi-pole magnetizing coil and the center of the magnetizing yoke. Therefore, when the multi-pole magnetizing is executed for the magnetic encoder base plate, the magnetic encoder base plate is attached to the magnetizing jig, the magnetizing jig is incorporated into the magnetizing yoke in a manner that the magnetic encoder base plate faces to the circular magnetizing face of the magnetizing yoke, and the magnetizing jig is rotated around the center of the magnetizing yoke. Then, the center of the attached ring-like magnetic encoder base plate can be approximately obtained at the position which nearly meets the arrangement center of the multi-pole magnetizing coil.

When the magnetizing jig is kept at thus obtained position and electricity is supplied to the wire of the multi-pole magnetizing coil, the S poles and the N poles are alternately repeated around the center of the magnetic encoder base plate in a circumferential manner on the magnetizing portion thereof, thereby obtaining a multi-pole magnetic encoder. The circular magnetizing pattern which repeats the S poles and the N poles is formed concentrically with the magnetic encoder base plate, so that if thus obtained magnetic encoder is attached to the rotary member like the wheels of vehicle in a coaxial manner to detect the rotational velocity, there arises no magnetizing angle deviation for the rotary center and the pulse generation performance caused by the accumulation pitch difference is not reduced. Although these magnetizing operations are very simple, highly accurate magnetizing is possible, and further, the drilling operation accuracy for the positioning hole of the magnetizing yoke is not required so much, so that the processing labor is largely reduced. According to the above-mentioned effects, the practical usefulness of the present invention is extremely large.

According to the present invention as set forth in claim 2 or 3, the magnetizing jig body is incorporated into the magnetizing yoke via the positioning member comprised of a tubular bush and the insertion center of the positioning member for the magnetizing yoke and the insertion center of the positioning member for the magnetizing jig body are deviated each other corresponding to the positioning deviation amount. Therefore, by arranging the insertion of the positioning member, the center of the ring-like magnetic encoder base plate can be easily and approximately obtained at the position which nearly meets the arrangement center of the multi-pole magnetizing coil. Further according to the present invention as set forth in claim 4 or 5, when the magnetizing jig is constructed so as to directly attach the magnetizing yoke, the number of members can be reduced in addition to the above-mentioned easy obtaining operation.

Still further according to the present invention as set forth in claim 6 or 7, the disc-like magnetic encoder or a tubular magnetic encoder can be simply formed with accuracy like the above-mentioned embodiments. A magnetic encoder having a section like the letter L formed by connecting the disc portions or the tubular portions may be designed by appropriately varying the shape of the multi-pole magnetizing coil, magnetizing yoke and magnetizing jig. It goes without saying that these design variations are possible according to the intended purpose.

BEST MODE FOR CARRYING OUT THE INVENTION

The present invention will be detailed referring to the attached drawings.

Embodiment 1

Figure 1:
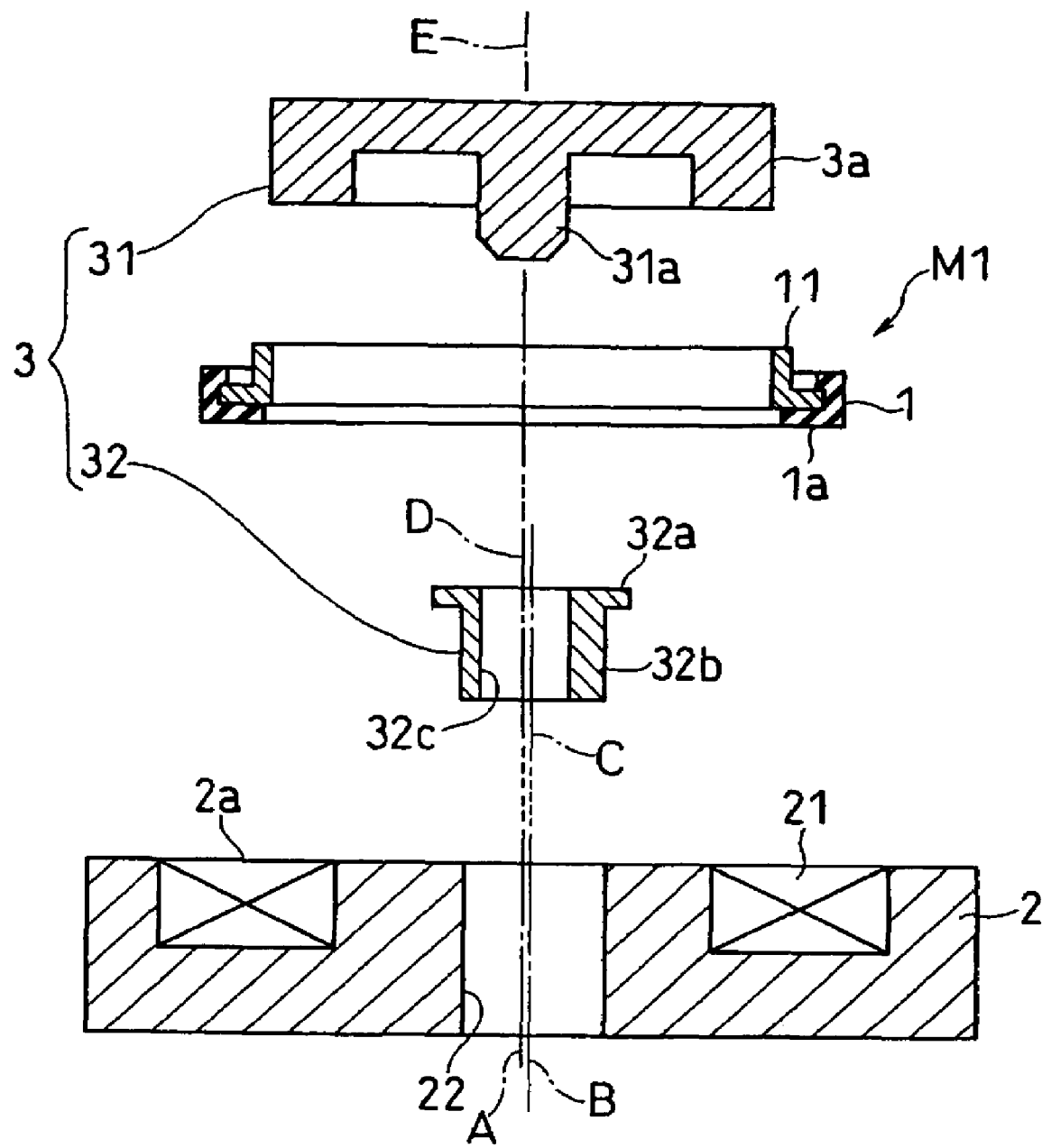
FIG. 1 is an exploded vertical sectional view of a magnetizing apparatus using a magnetizing jig of the first embodiment of the present invention.
Figure 2:
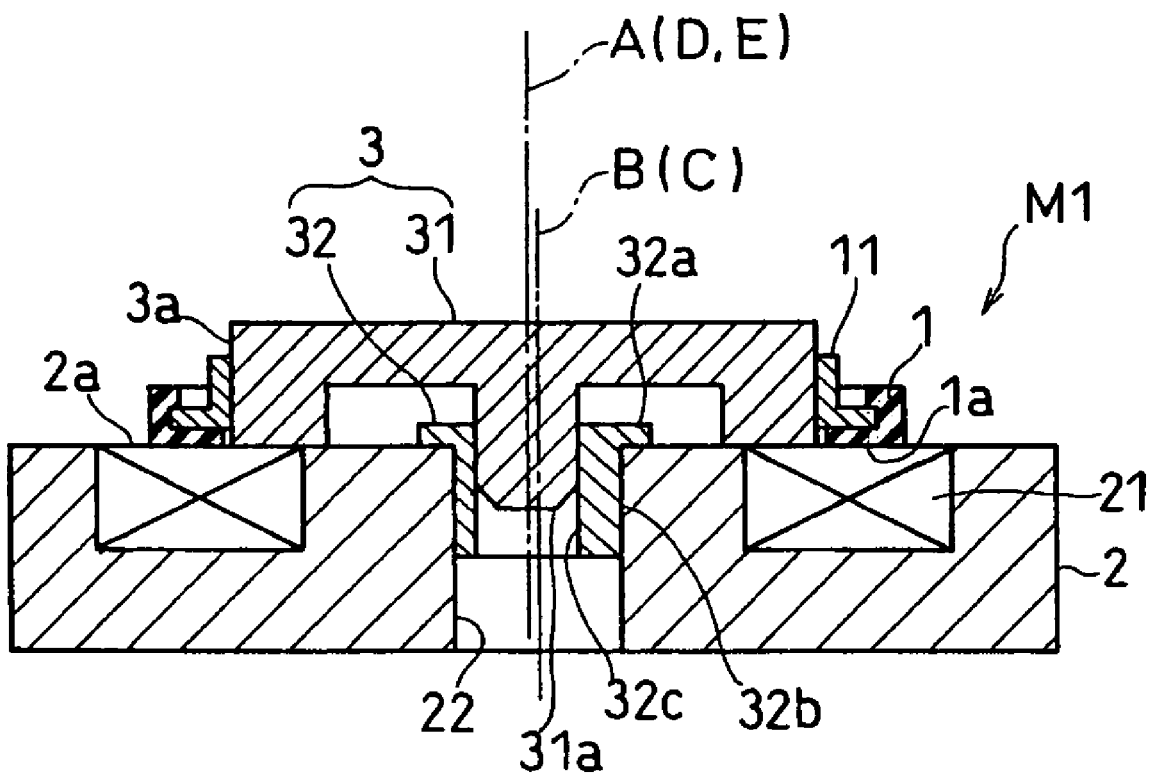
FIG. 2 is a vertical sectional view when a magnetizing jig is incorporated.
Figure 3:
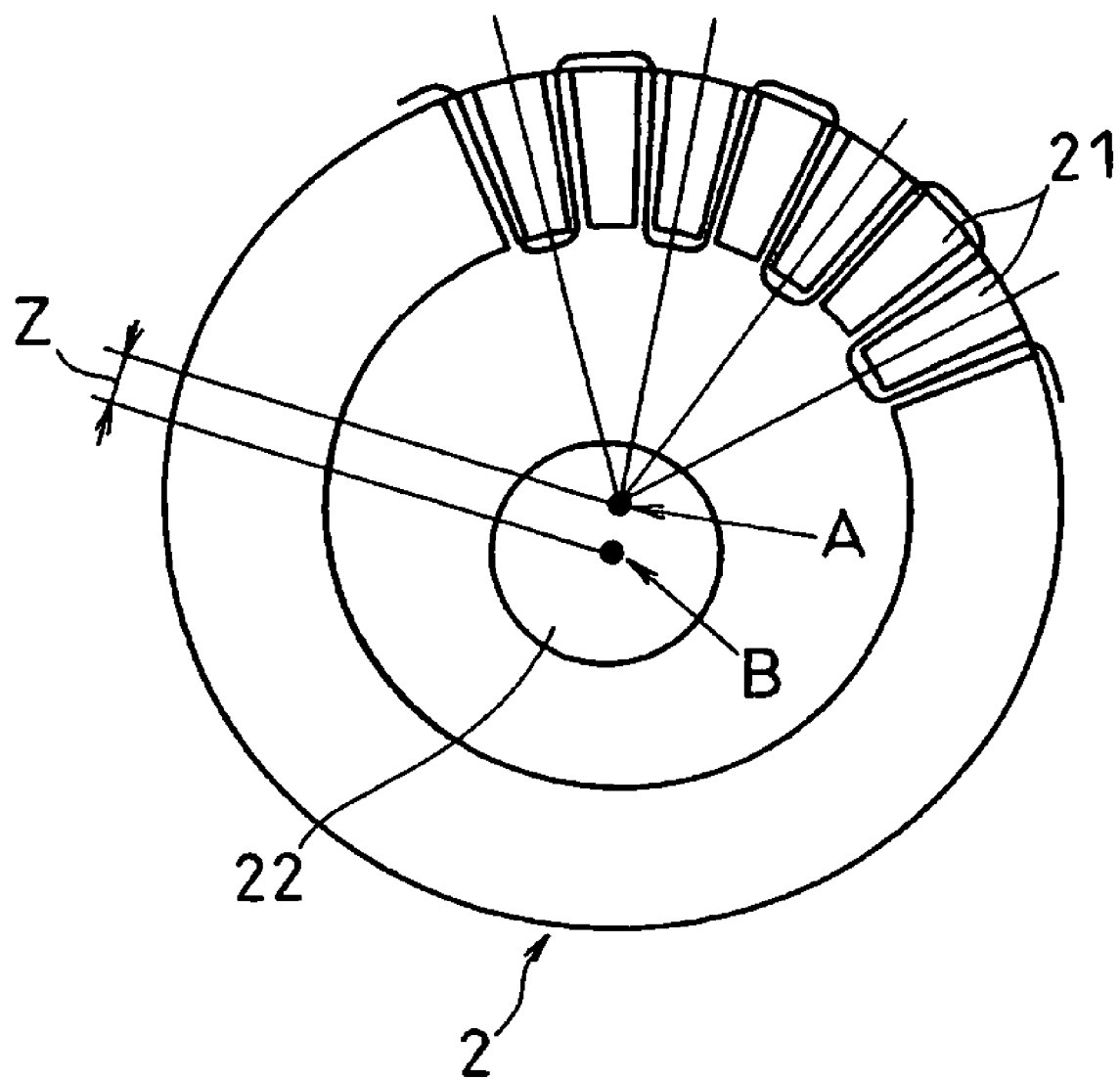
FIG. 3 is a plane view showing a magnetizing yoke in the first embodiment.

FIG. 1–FIG. 3 show a magnetizing apparatus M1 of a magnetic encoder (multi-pole magnet) for use in a wheel rotation detection apparatus of automobiles. A magnetizing yoke 2 is comprised of a disc-like member having a circular magnetizing face 2a at its upper face, the magnetizing face 2a being provided with plural multi-pole magnetizing coils 21 radially wound with coil wires in a circumferential direction at regular interval and being embedded so as to expose the upper face via a filler like resin. A hole (positioning hole) 22 for a holding jig is formed at the center of the magnetizing yoke 2. FIG. 3 diagrammatically shows the relation of the arrangement position of the multi-pole magnetizing coil 21 and the hole 22 for the holding or fixing jig. During production of the magnetizing yoke 2, slight deviation Z is inevitably caused between the arrangement center A of the multi-pole magnetizing coil 21 and the center B of the hole 22 for the holding or filing jig (center of magnetizing yoke 2) being a setting standard of the magnetizing jig. FIG. 3 exaggerates such deviation Z.

Magnetizing jig 3 is comprised of a disc-like body 31 and a tubular bush 32 as a positioning member. Cylindrical boss 31a is concentrically formed downwardly at the center of the lower face of the body 31. The tubular bush 32 has an outward flange portion 32a at its upper end, an outer tubular portion 32b is designed so as to be internally fitted in the hole 22 for fixing the jig, and the inner tubular portion 32c is designed so as to be externally fitted in the boss 31a.

Ring-like magnetic encoder base plate 1 is a cast body made of rubber material with a L-shaped section in which a magnetic material such as ferrite is mixed and is integrally attached with the circumference of a ring-like core material plate 11 with a L-shaped section. The outer circumference of the body 31 of the magnetizing jig body 3 forms an holding portion 3a of the magnetic encoder base plate and the ring-like magnetic encoder base plate 1 is externally fitted into the holding portion 3a of the magnetic encoder base plate of the core material plate 11 to be attached and fixed with the body 31. The disc surface of the disc-like portion of the magnetic encoder base plate 1 forms a portion 1a to be magnetized.

The outer tubular portion 32b of the tubular bush 32 is formed so as to be internally fitted in the hole 22 for the holding jig, so that the center C of the outer tubular portion 32b meets the center B of the hole 22 for holding jig. On the other hand, the inner tubular portion 32c is formed so as to be deviated relative to the outer tubular portion 32b so as to correspond to the positional deviation amount Z. The inner tubular portion 32c is designed to be externally fitted into the boss 31a, the center D is formed in such a manner that it meets the center E of the boss 31a (which is also the center of the magnetizing jig body 31 and the center of the ring-like magnetic encoder base plate 1) and is deviated relative to the center C of the outer tubular portion 32b corresponding to the deviation Z. The deviation amount is calculated in advance from the statistic data of the positional deviation amount Z obtained during production of the magnetizing yoke 2.

When the magnetizing apparatus M1 is constructed with the above-mentioned magnetizing jig 3 to apply multi-pole magnetizing on the magnetic encoder base plate 1, at first, the magnetic encoder base plate 1 is externally fitted to the holding portion 3a of the magnetic encoder base plate 31 of the magnetizing jig body via the core material plate 11. Then, the tubular bush 32 is inserted into the hole 22 for the holding jig of the magnetizing yoke 2 to be associated with the hole 22 by means of the outward flange portion 32a. Under such condition, when the tubular bush 32 is rotated around the center C of the outer tubular portion 32b (the center B of the hole 22 for holding jig), the center D of the inner tubular portion 32c is approximately obtained at the position which nearly meets the arrangement center A of the multi-pole magnetizing coil 21.

Then, when the boss 31a of the magnetizing jig body 31 is inserted into the inner tubular portion 32c and the magnetizing jig body 31 is set on the circular magnetizing face 2a of the magnetizing yoke 2, the disc-like portion to be magnetized 1a of the magnetic encoder base plate 1 is placed on the upper surface of the multi-pole magnetizing coil 21 in such a manner that the center E of the boss 31a, namely the center of the ring-like magnetic encoder base plate 1, approximately meets the arrangement center A of the multi-pole magnetizing coil 21. When the multi-pole magnetizing coil 21 is supplied with electricity, a circular multi-pole magnetizing pattern such that S poles and N poles are alternately repeated is formed on the portion to be magnetized 1a of the ring-like magnetic encoder base plate 1, thus obtaining the ring-like magnetic encoder. The center of the circular multi-pole magnetizing pattern approximately meets the center E of the ring-like magnetic encoder base plate 1. When the ring-like magnetic encoder is attached to vehicle wheels together with the magnetic sensor to detect the rotational velocity, the center E of the ring-like magnetic encoder base plate 1 becomes the rotary center of the rotating member and a circular multi-pole magnetizing pattern is formed concentrically with the center E, so that there arises almost no deviation of the magnetizing angle relative to the rotary center and no deterioration of pulse generation performance based on the accumulated pitch difference.

Embodiment 2

Figure 4:
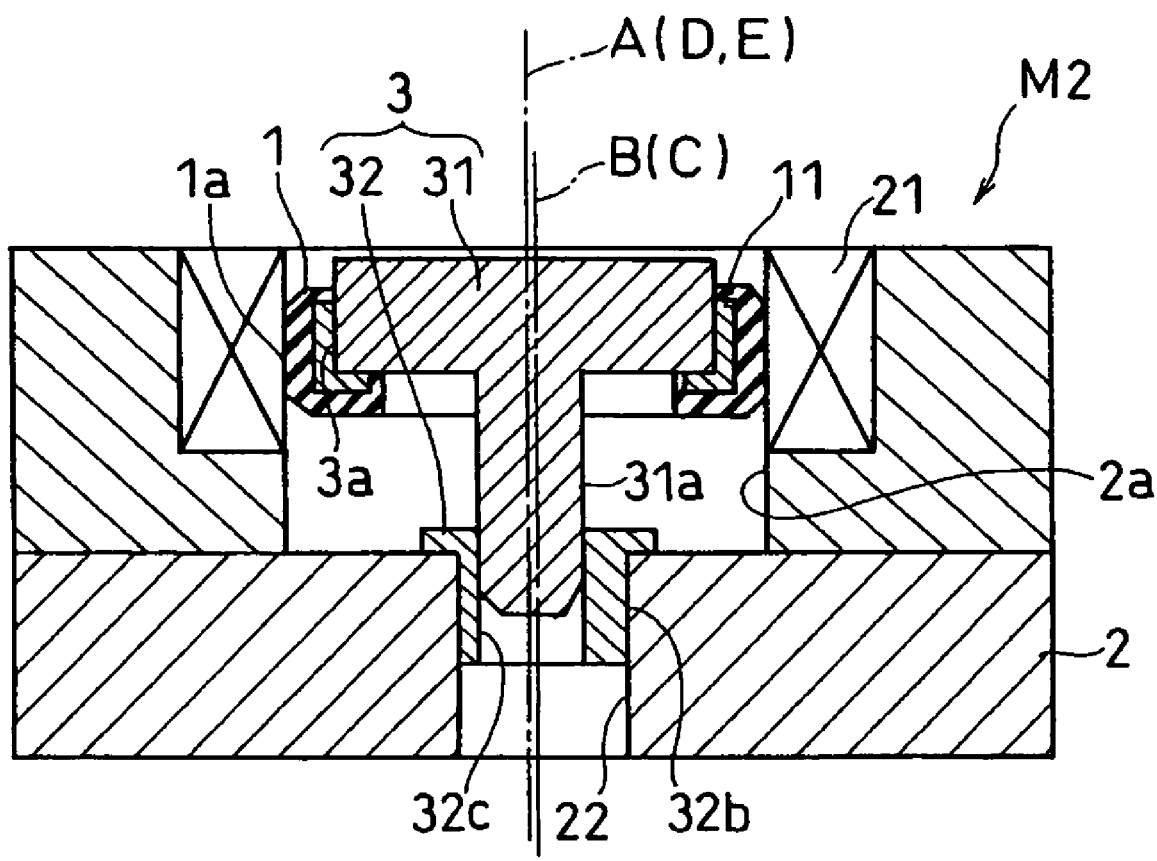
FIG. 4 is a vertical sectional view when a magnetizing jig is incorporated in the second embodiment.

The magnetizing apparatus M2 in FIG. 4 shows an embodiment such that a multi-pole magnetizing is executed for a ring-like magnetic encoder base plate 1 with a tubular portion to be magnetized 1a. The circular magnetizing face 2a of the magnetizing yoke 2 is an inner tubular portion in which a multi-pole magnetizing coil 21 wound with coil wires along the axis of the magnetizing yoke 2 is embedded along the radial direction with even space, as mentioned above. The magnetizing jig 3 is comprised of the magnetizing jig body 31 and the tubular bush 32 as a positioning member, similar to the above-mentioned embodiment. When the magnetizing jig body 31 mounted with the ring-like magnetic encoder base plate 1 is incorporated into the magnetizing yoke 2 via the tubular bush 32, the tubular portion to be magnetized 1a of the ring-like magnetic encoder base plate 1 is designed to face the multi-pole magnetizing coil 21 at the circular magnetizing face 2a.

The arrangement of the centers A, B, C, D, E of the magnetizing yoke 2, the hole 22 for holding jig, the tubular bush 32, and the magnetic jig body 31 is based on the technical background of the above-mentioned embodiment. Therefore, the magnetizing apparatus M2 can obtain a ring-like magnetic encoder for detecting revolution number in which there is no magnetizing angle deviation relative to the rotary center and no deterioration of pulse generation performance caused by the accumulated pitch difference as mentioned above. Other constructions are the same as the above-mentioned embodiment, so that common reference numbers are allotted to omit their explanation.

Embodiment 3

Figure 5:
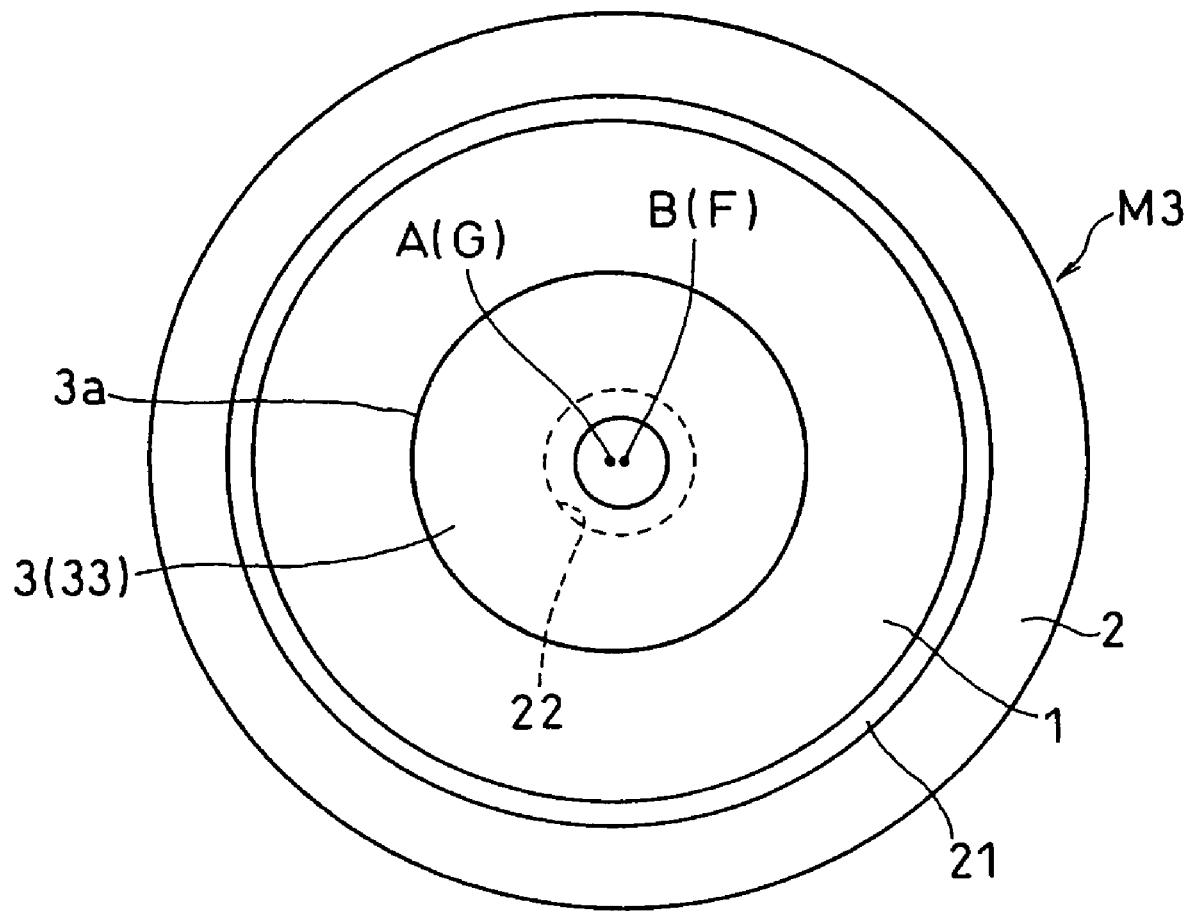
FIG. 5 is a plane view showing a magnetizing apparatus in the third embodiment.
Figure 6:
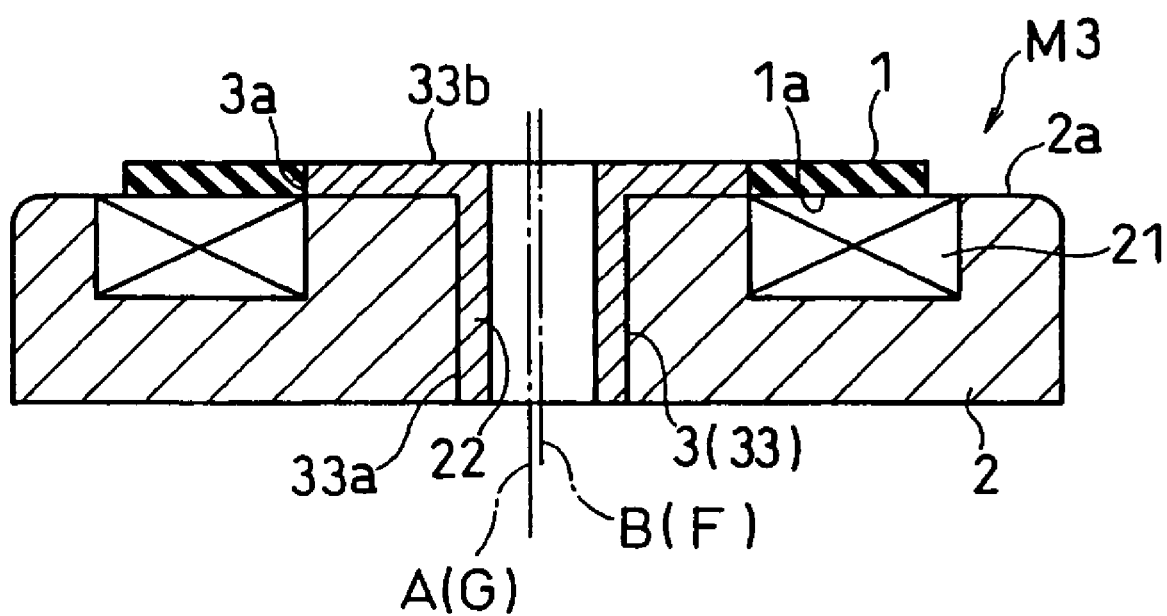
FIG. 6 is a vertical sectional view when a magnetizing jig is incorporated in the third embodiment.

The magnetizing jig 3 of the magnetizing apparatus M3 shown in FIG. 5 and FIG. 6 is comprised of a tubular bush structure 33 and directly holds the ring-like magnetic encoder base plate 1 like a disc. The tubular bush structure 33 is comprised of a tubular portion 33a which is inserted in the hole 22 for holding jig formed at the center of the magnetizing yoke 2 and an outward flange portion 33b integrally formed with the upper end, and the outer circumference of the annular outward flange portion 33b forms an holding portion 3a for the magnetic encoder base plate. The center F of the outer tubular portion of the tubular portion 33a is designed to meet the center B of the hole for holding jig 22 (the center of the magnetizing yoke 2) and the center G of the outward flange portion 33b is designed to be deviated from the center F so as to correspond to the above-mentioned positional deviation amount Z of the arrangement center A of the multi-pole magnetizing coil 21 and the center B of the hole 22 for holding jig, which is inevitably caused during production of the magnetizing yoke 2 (see FIG. 3).

After the ring-like magnetic encoder base plate 1 is externally fitted into the holding portion 3a of the magnetic encoder base plate, the tubular portion 33a is inserted in the jig holding hole (inserting and holding part) 22, the tubular bush structure 33 is set on the magnetizing yoke 2 in such a manner that the portion to be magnetized 1a of the ring-like magnetic encoder base plate 1 is placed on the upper face of the multi-pole magnetizing coil 21 constituting the circular magnetizing face 2a. Then the tubular bush structure 33 is rotated around the center F of the outer tubular portion of the tubular portion 33a, so that the center G of the outward flange portion 33b can be approximately obtained at the position which nearly meets the arrangement center A of the multi-pole magnetizing coil 21.

Multi-pole magnetizing is executed such that the center of the ling-like magnetic encoder base plate 1 which serves as a rotary center nearly meets the arrangement center A of the multi-pole magnetizing coil 21. Therefore, like the above-mentioned embodiments, the magnetizing apparatus M3 can obtain a ring-like magnetic encoder for detecting revolution number in which there is no magnetizing angle deviation relative to the rotary center and no deterioration of pulse generation performance caused by the accumulated pitch difference. In the figure, the ring-like magnetic encoder base plate 1 is directly attached on the holding portion 3a of the magnetic encoder base plate, however, it may be attached via the core material plate 11 mentioned in the embodiments 1 and 2. Other constructions are the same as the above-mentioned embodiment, so that common reference numbers are allotted to omit their explanation.

Embodiment 4

Figure 7:
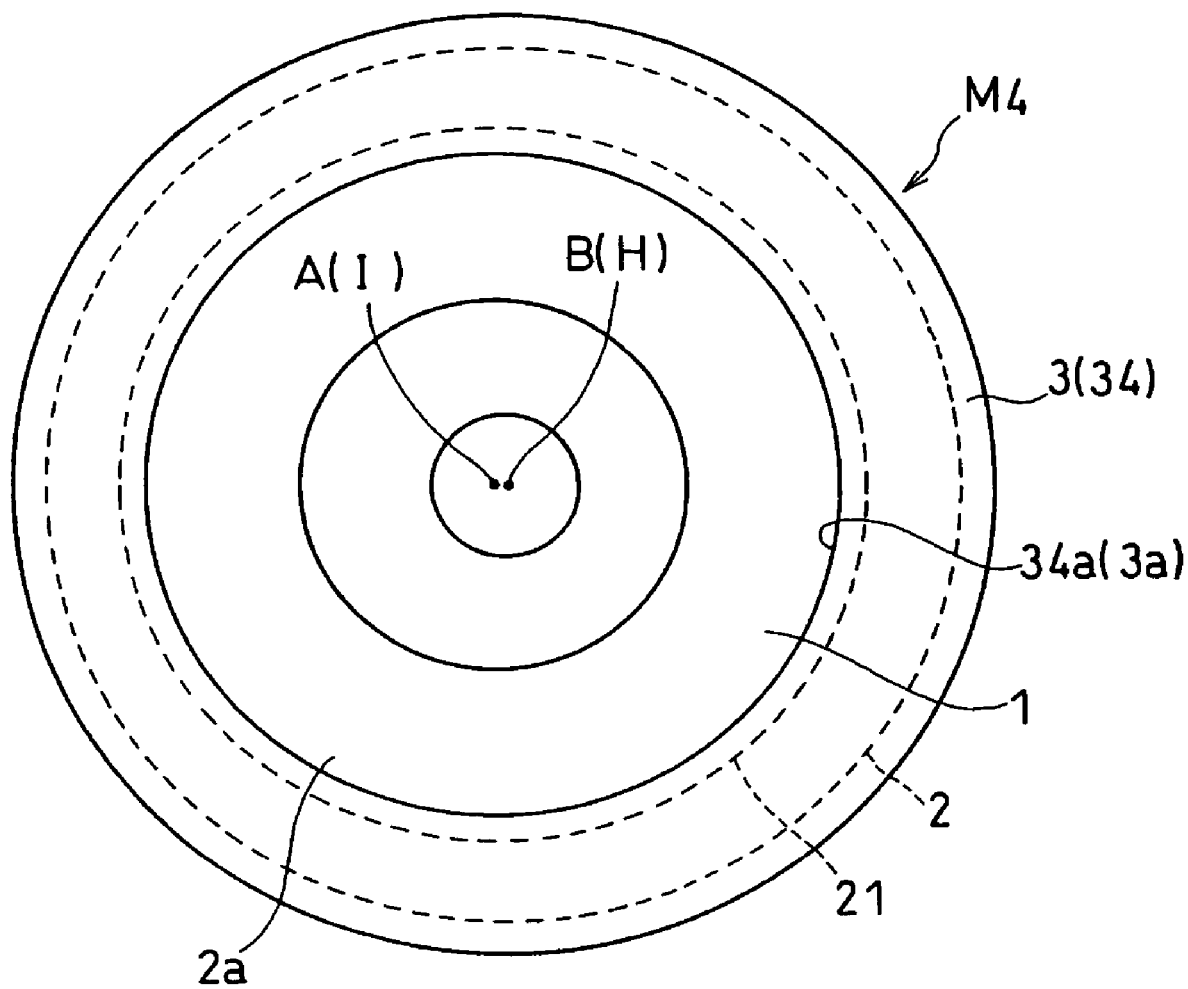
FIG. 7 is a plane view showing a magnetizing apparatus in the fourth embodiment.
Figure 8:
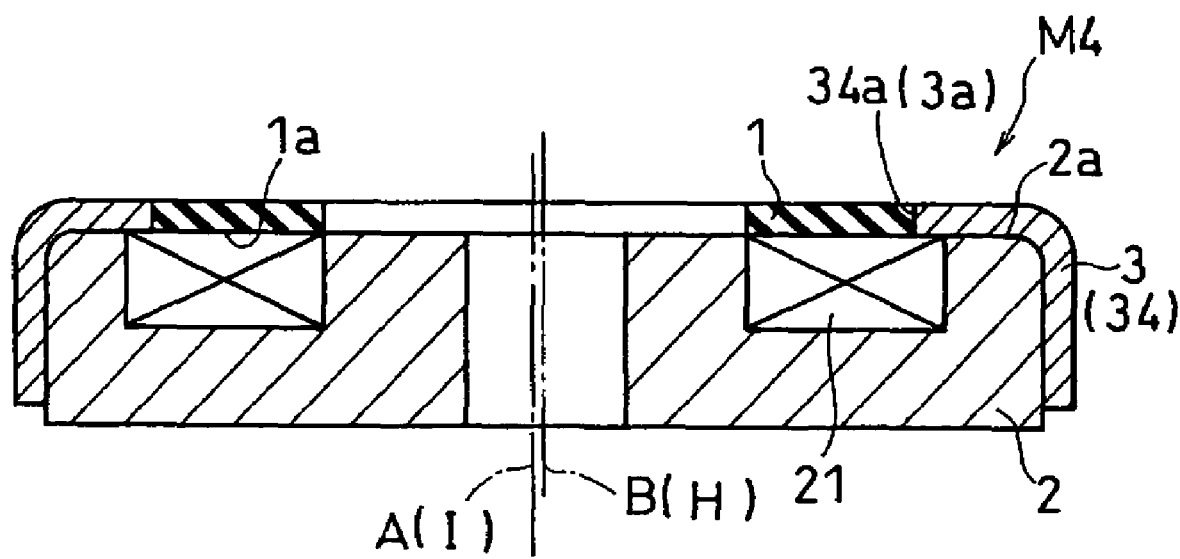
FIG. 8 is a vertical sectional view when a magnetizing jig is incorporated in the fourth embodiment.

The magnetizing jig 3 of the magnetizing apparatus M4 shown in FIG. 7 and FIG. 8 is comprised of a circular basin-like guide body 34 and other embodiment is shown such that the jig 3 directly holds the ring-like magnetic encoder base plate 1 like a disc. The circular basin-like guide body 34 is placed with the bottom up and is externally fitted so as to cover the magnetizing yoke 2 of which upper circular magnetizing face 2a the multi-pole magnetizing coil 21 is embedded as mentioned above. Hole 34a is formed at the bottom center thereof and forms the holding portion 3a of the magnetic encoder base plate in such a manner that the inner circumference of the bore 34a externally holds the ring-like magnetic encoder base plate 1. The center H of the circular basin-like guide body 34a is formed so as to meet the center B of the magnetizing yoke 2 and the center I of the bore 34a is set to be deviated from the center H so as to correspond to the above-mentioned positional deviation amount Z of the arrangement center A of the multi-pole magnetizing coil 21 and the center B of the hole 22 for holding jig, which is inevitably caused during production of the magnetizing yoke 2 (see FIG. 3).

After the ring-like magnetic encoder base plate 1 is internally fitted into the holding portion 3a of the magnetic encoder base plate, the circular basin-like guide body 34 is externally fitted into the magnetizing yoke 2 and is set on the magnetizing yoke 2 in such a manner that the portion to be magnetized 1a of the ring-like magnetic encoder base plate 1 is placed on the upper face of the multi-pole magnetizing coil 21 constituting the circular magnetizing face 2a. Then the circular basin-like guide body 34 is rotated around the center B of the magnetizing yoke 2, so that the center I of the bore 34a can be approximately obtained at the position which nearly meets the arrangement center A of the multi-pole magnetizing coil 21.

Multi-pole magnetizing is executed such that the center of the ling-like magnetic encoder base plate 1 which serves as a rotary center nearly meets the arrangement center A of the multi-pole magnetizing coil 21. Therefore, like the above-mentioned embodiments, the magnetizing apparatus M4 can obtain a ring-like magnetic encoder for detecting revolution number in which there is no magnetizing angle deviation relative to the rotary center and no deterioration of pulse generation performance caused by the accumulated pitch difference. Other constructions are the same as the above-mentioned embodiments, so that common reference numbers are allotted to omit their explanation.

Embodiment 5

Figure 9:
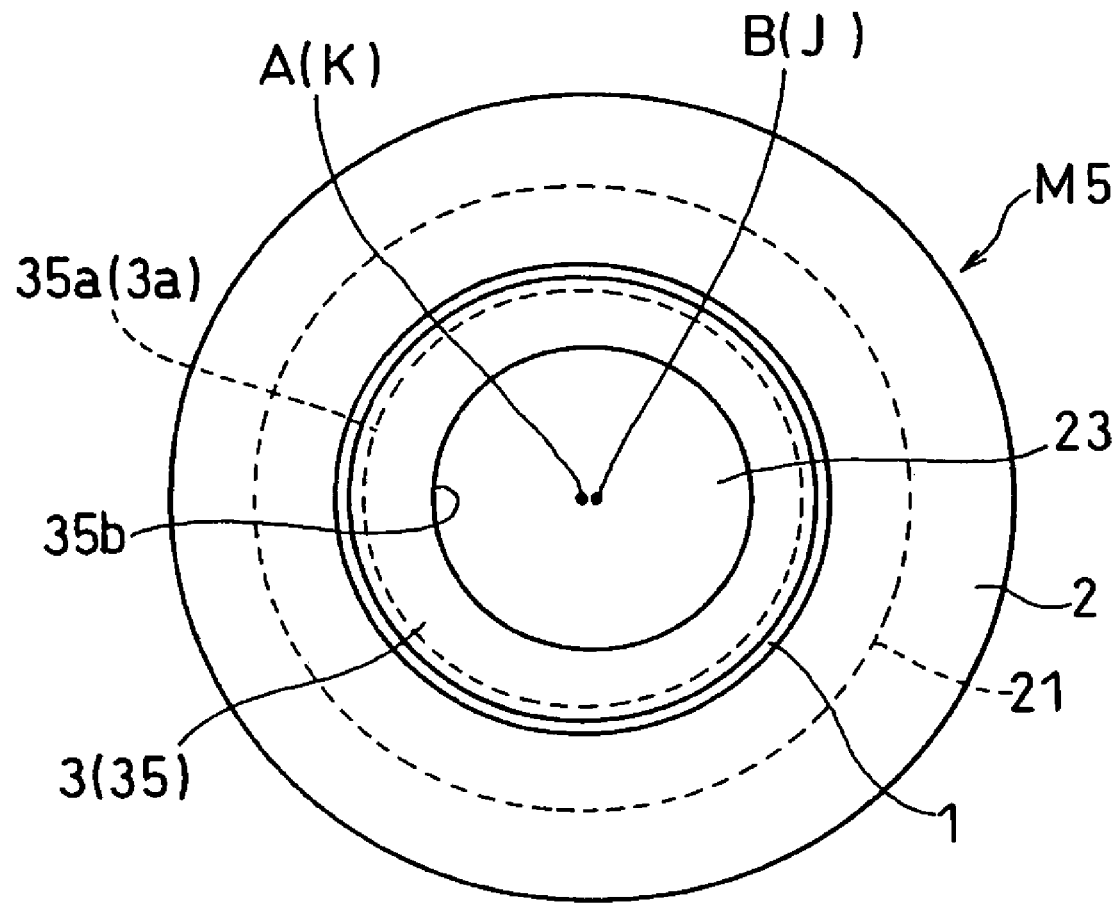
FIG. 9 is a plane view showing a magnetizing apparatus in the fifth embodiment and showing the apparatus in FIG. 10 from the bottom.
Figure 10:
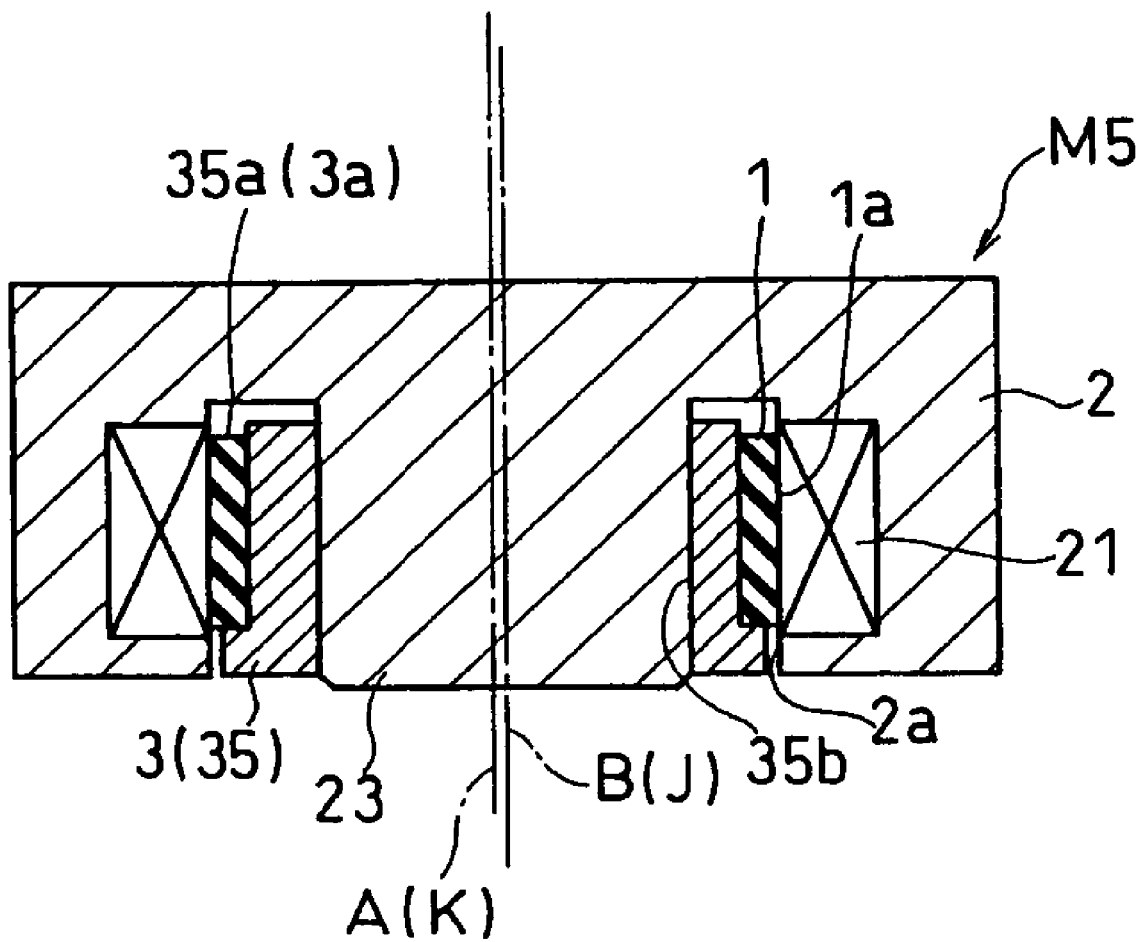
FIG. 10 is a vertical sectional view when a magnetizing jig is incorporated in the fifth embodiment.
Figure 11:
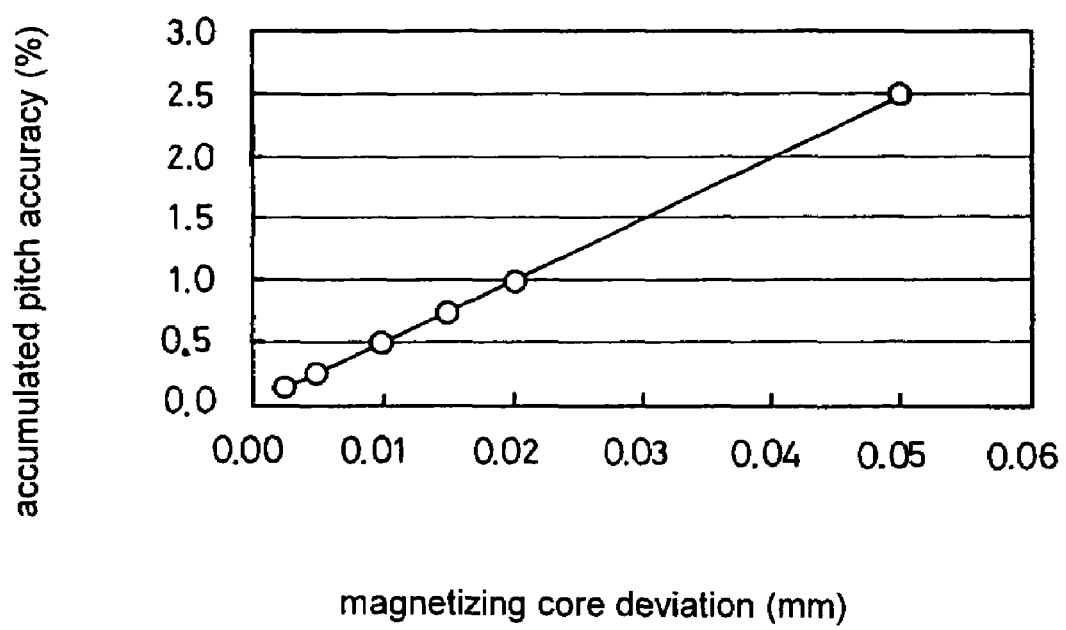
FIG. 11 is a graph showing the relation of a deviation degree of a magnetizing portion (relative to a rotary center) and the accumulation pitch accuracy of a magnetic encoder.

The magnetizing jig 3 of the magnetizing apparatus M5 shown in FIG. 9 and FIG. 10 is comprised of a tubular bush structure 35 and still other embodiment is shown such that the jig 3 directly holds the ring-like magnetic encoder base plate 1 like a disc. FIG. 9 is a view when the magnetizing apparatus M5 of FIG. 10 is shown from the bottom. The ring-like magnetic encoder base plate 1 is tubular and its outer tubular portion is formed as the portion to be magnetized 1a. The outer tubular portion 35a of the tubular bush structure 35 is served as the holding portion 3a of the magnetic encoder base plate and the tubular magnetic encoder base plate 1 is externally fitted into the holding portion 3a of the magnetic encoder base plate.

The magnetizing yoke 2 is tubular and the inner tubular portion becomes a circular magnetizing face 2a, in which the multi-pole magnetizing coil 21 is embedded in its circumferential direction as mentioned above. Cylindrical boss portion for holding jig (inserting and holding portion) 23 is formed at the center of the magnetizing yoke 2, into which the tubular bush structure 35 is externally fitted. The center J of the inner tubular portion 35b of the tubular bush structure 35 is formed so as to meet the center B of the cylindrical boss portion 23 for holding jig (the center of the magnetizing yoke), the center K of the outer tubular portion 35a of the tubular bush structure 35 is set to be deviated from the center J so as to correspond to the above-mentioned positional deviation amount Z of the arrangement center A of the multi-pole magnetizing coil 21 and the center B of the hole 22 for holding jig, which is inevitably caused during production of the magnetizing yoke 2 (see FIG. 3).

After the ring-like magnetic encoder base plate 1 is externally fitted into the holding portion 3a of the magnetic encoder base plate, the tubular bush structure 35 is externally fitted into the cylindrical boss portion 23 for holding jig and is set on the magnetizing yoke 2 in such a manner that the portion to be magnetized 1a of the ring-like magnetic encoder base plate 1 is placed on the upper face of the multi-pole magnetizing coil 21 constituting the circular magnetizing face 2a. Then the tubular bush structure 35 is rotated around the center B of the cylindrical boss portion 23 for holding jig, so that the center K of the outer tubular portion 35a can be approximately obtained at the position which nearly meets the arrangement center A of the multi-pole magnetizing coil 21.

Multi-pole magnetizing is executed such that the center of the ring-like magnetic encoder base plate 1 which serves as a rotary center nearly meets the arrangement center A of the multi-pole magnetizing coil 21. Therefore, like the above-mentioned embodiments, the magnetizing apparatus M5 can obtain a ring-like magnetic encoder for detecting revolution number in which there is no magnetizing angle deviation relative to the rotary center and no deterioration of pulse generation performance caused by the accumulated pitch difference. Other constructions are the same as the above-mentioned embodiment, so that common reference numbers are allotted to omit their explanation.

INDUSTRIAL APPLICABILITY

The magnetizing jig of the present invention is designed to be incorporated into the magnetizing yoke while holding the magnetic encoder base plate in order to magnetize the magnetic encoder used for detecting the rotational velocity of the vehicle wheels.

The invention claimed is:

1. A magnetizing jig used in cooperation with a magnetizing yoke for fixing a ring-like magnetic encoder base plate thereto and magnetizing it by exciting a multi-pole magnetizing coil provided on a circular magnetizing face of said magnetizing yoke along its circumference at the same interval, wherein said magnetizing jig comprises a holding portion for concentrically holding said magnetic encoder base plate so as to face said circular magnetizing face, and wherein said magnetizing jig is incorporated into said magnetizing yoke, keeping a predetermined positional relation which is in advance deviated from the center of said magnetizing yoke so as to correspond to the positional deviation amount between the arrangement center of said multi-pole magnetizing coil and the center of said magnetizing yoke.

2. The magnetizing jig as set forth in claim 1, wherein said magnetizing jig comprises a magnetizing jig body provided with said holding portion, and a positioning member interposed between said magnetizing jig body and said magnetizing yoke, for positioning said magnetizing jig body for said magnetizing yoke, and wherein the insertion center of said positioning member for said magnetizing yoke and the insertion center of said positioning member for said magnetizing jig body are deviated each other corresponding to said deviation amount.

3. The magnetizing jig as set forth in claim 2, wherein said magnetizing yoke has a bore for holding jig at its center, whereas said positioning member comprises a tubular bush which is internally fitted into said bore and is externally fitted into a boss portion concentrically formed at the center of said magnetizing jig body, and wherein the center of an inner tubular portion of said tubular bush and the center of an outer tubular part of said tubular bush internally fitted into said bore are deviated each other corresponding to said deviation amount.

4. The magnetizing jig as set forth in claim 1, wherein said magnetizing jig comprises a tubular bush structure with a holding portion for holding said base plate, which is internally fitted into said ring-like magnetic encoder base plate, whereas said magnetizing yoke has at its center an insertion holding portion into which said bush structure is inserted, and wherein the center of said tubular bush structure for said holding portion and an insertion center of said tubular bush structure for said magnetizing yoke are deviated each other corresponding to said deviation amount.

5. The magnetizing jig as set forth in claim 1, wherein said magnetizing jig comprises a circular basin-like guide body with a bored holding portion into which said ring-like magnetic encoder base plate is externally inserted, whereas said guide body is externally fitted into a circular yoke, and wherein the center of said guide body for said holding portion and the external insertion center of said guide body for said magnetizing yoke are deviated each other corresponding to said deviation amount.

6. The magnetizing jig as set forth in claim 1, wherein said magnetic encoder base plate has a disc like portion to be magnetized, whereas said circular magnetizing face is formed on a disc surface of a disc-like magnetizing yoke, and said multi-pole magnetizing coil is composed of wires radially wound around said magnetizing yoke, and wherein said disc face of said disk-like magnetic encoder base plate is magnetized by exciting said multi-pole magnetizing coil.

7. The magnetizing jig as set forth in claim 1, wherein said magnetic encoder base plate has a tubular portion to be magnetized, whereas said circular magnetizing portion is formed in said inner tubular face of said tubular magnetizing yoke, and said multi-pole magnetizing coil is composed of wires wound along the axis of said magnetizing yoke, and wherein an outer tubular face of said tubular magnetic encoder base plate is magnetized by exciting said multi-pole magnetizing coil.

8. The magnetizing jig as set forth in claim 2, wherein said magnetic encoder base plate has a disc like portion to be magnetized, whereas said circular magnetizing face is formed on a disc surface of a disc-like magnetizing yoke, and said multi-pole magnetizing coil is composed of wires radially wound around said magnetizing yoke, and wherein said disc face of said disk-like magnetic encoder base plate is magnetized by exciting said multi-pole magnetizing coil.

9. The magnetizing jig as set forth in claim 3, wherein said magnetic encoder base plate has a disc like portion to be magnetized, whereas said circular magnetizing face is formed on a disc surface of a disc-like magnetizing yoke, and said multi-pole magnetizing coil is composed of wires radially wound around said magnetizing yoke, and wherein said disc face of said disk-like magnetic encoder base plate is magnetized by exciting said multi-pole magnetizing coil.

10. The magnetizing jig as set forth in claim 4, wherein said magnetic encoder base plate has a disc like portion to be magnetized, whereas said circular magnetizing face is formed on a disc surface of a disc-like magnetizing yoke, and said multi-pole magnetizing coil is composed of wires radially wound around said magnetizing yoke, and wherein said disc face of said disk-like magnetic encoder base plate is magnetized by exciting said multi-pole magnetizing coil.

11. The magnetizing jig as set forth in claim 5, wherein said magnetic encoder base plate has a disc like portion to be magnetized, whereas said circular magnetizing face is formed on a disc surface of a disc-like magnetizing yoke, and said multi-pole magnetizing coil is composed of wires radially wound around said magnetizing yoke, and wherein said disc face of said disk-like magnetic encoder base plate is magnetized by exciting said multi-pole magnetizing coil.

12. The magnetizing jig as set forth in claim 2, wherein said magnetic encoder base plate has a tubular portion to be magnetized, whereas said circular magnetizing portion is formed in said inner tubular face of said tubular magnetizing yoke, and said multi-pole magnetizing coil is composed of wires wound along the axis of said magnetizing yoke, and wherein an outer tubular face of said tubular magnetic encoder base plate is magnetized by exciting said multi-pole magnetizing coil.

13. The magnetizing jig as set forth in claim 3, wherein said magnetic encoder base plate has a tubular portion to be magnetized, whereas said circular magnetizing portion is formed in said inner tubular face of said tubular magnetizing yoke, and said multi-pole magnetizing coil is composed of wires wound along the axis of said magnetizing yoke, and wherein an outer tubular face of said tubular magnetic encoder base plate is magnetized by exciting said multi-pole magnetizing coil.

14. The magnetizing jig as set forth in claim 4, wherein said magnetic encoder base plate has a tubular portion to be magnetized, whereas said circular magnetizing portion is formed in said inner tubular face of said tubular magnetizing yoke, and said multi-pole magnetizing coil is composed of wires wound along the axis of said magnetizing yoke, and wherein an outer tubular face of said tubular magnetic encoder base plate is magnetized by exciting said multi-pole magnetizing coil.

15. The magnetizing jig as set forth in claim 5, wherein said magnetic encoder base plate has a tubular portion to be magnetized, whereas said circular magnetizing portion is formed in said inner tubular face of said tubular magnetizing yoke, and said multi-pole magnetizing coil is composed of wires wound along the axis of said magnetizing yoke, and wherein an outer tubular face of said tubular magnetic encoder base plate is magnetized by exciting said multi-pole magnetizing coil.

* * * * *